(12) United States Patent
Harper et al.

(10) Patent No.: US 12,086,371 B2
(45) Date of Patent: Sep. 10, 2024

(54) DYNAMICALLY RESIZABLE CONTENT FOR ELECTRONIC DEVICES

(71) Applicant: Apple Inc., Cupertino, CA (US)

(72) Inventors: John S. Harper, London (GB); Jacob A. Xiao, Los Gatos, CA (US); Neil N. Desai, San Francisco, CA (US); Patrick R. Metcalfe, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/133,458

(22) Filed: Apr. 11, 2023

(65) Prior Publication Data

US 2023/0367442 A1    Nov. 16, 2023

Related U.S. Application Data

(60) Provisional application No. 63/340,418, filed on May 10, 2022.

(51) Int. Cl.
  *G06F 17/00*    (2019.01)
  *G06F 3/0481*   (2022.01)
  *G06T 13/80*    (2011.01)

(52) U.S. Cl.
  CPC ............ *G06F 3/0481* (2013.01); *G06T 13/80* (2013.01)

(58) Field of Classification Search
  CPC .. G06F 3/0481; G06T 13/80; H04M 1/72427; H04M 1/72469
  See application file for complete search history.

(56) References Cited

U.S. PATENT DOCUMENTS 8,566,732 B2  10/2013  Louch et al.
8,797,330 B1 *  8/2014  Haase ................... G06F 3/0481
                                                      345/473

(Continued)

FOREIGN PATENT DOCUMENTS

CN          110569096 A      12/2019
WO      WO 2019/236419      12/2019

(Continued)

OTHER PUBLICATIONS

Vanderdonckt, Jean, "Animated Transitions for Empowering Interactive Information Systems", 2012 Sixth International Conference on Research Challenges in Information Science (RCIS), pp. 1-12, May 1, 2012. (Year: 2012).*

(Continued)

*Primary Examiner* — Laurie A Ries
(74) *Attorney, Agent, or Firm* — BAKERHOSTETLER

(57) ABSTRACT

Dynamically resizable UI views for electronic devices are disclosed. The dynamically resizable UI views may be UI views for widgets. In one or more implementations, an application provides, to a system process, multiple states for a user interface (UI) view for the application, and one or more transition definitions each defining a transition between two of the multiple states. When a user, or content of the UI view, triggers a change from one of the multiples states to another of the multiple states of the UI view, the system process may animate the change according to the one or more transition definitions. In one or more implementations, an application provides system animated transitions between application UI States, and provides application data to be displayed in the rendered UI view.

20 Claims, 8 Drawing Sheets

(56) References Cited

U.S. PATENT DOCUMENTS

| | | | |
|---|---|---|---|
| 9,104,294 B2 | 8/2015 | Forstall et al. | |
| 9,349,205 B2 * | 5/2016 | Beaver | G06F 3/0482 |
| 10,656,755 B1 * | 5/2020 | Smith | G06F 1/1647 |
| 10,802,660 B1 * | 10/2020 | Krivopaltsev | G06F 3/0481 |
| 11,488,340 B2 * | 11/2022 | Furtwangler | G06T 13/80 |
| 11,836,593 B1 * | 12/2023 | Cosic | G06N 3/006 |
| 11,836,791 B2 * | 12/2023 | Simpson | G06Q 30/0609 |
| 2009/0150813 A1 * | 6/2009 | Chang | G06F 3/0481 |
| | | | 715/764 |
| 2010/0235769 A1 * | 9/2010 | Young | G06F 9/451 |
| | | | 715/764 |
| 2014/0365959 A1 * | 12/2014 | Mondello | G06F 16/958 |
| | | | 715/790 |
| 2015/0082235 A1 * | 3/2015 | Volchok | G06F 16/00 |
| | | | 715/781 |
| 2016/0342293 A1 * | 11/2016 | Ording | G06F 3/04845 |
| 2017/0296207 A1 * | 10/2017 | Bertagnoli | A61B 17/1757 |
| 2018/0059892 A1 * | 3/2018 | Riehl | G06F 9/451 |
| 2019/0096115 A1 * | 3/2019 | Furtwangler | G06T 13/80 |
| 2019/0347842 A1 * | 11/2019 | Henry | G06F 3/04817 |
| 2020/0348822 A1 * | 11/2020 | Dascola | G06F 3/048 |
| 2023/0005207 A1 * | 1/2023 | Kawamura | G06F 3/0484 |
| 2023/0011522 A1 * | 1/2023 | Cohen | G06F 16/904 |

FOREIGN PATENT DOCUMENTS

| | | | | |
|---|---|---|---|---|
| WO | WO-2019236419 A1 * | 12/2019 | | G06F 16/9024 |
| WO | WO-2022103472 A1 * | 5/2022 | | |

OTHER PUBLICATIONS

International Search Report and Written Opinion from PCT/US2023/021597, dated Aug. 14, 2023, 13 pages.

* cited by examiner

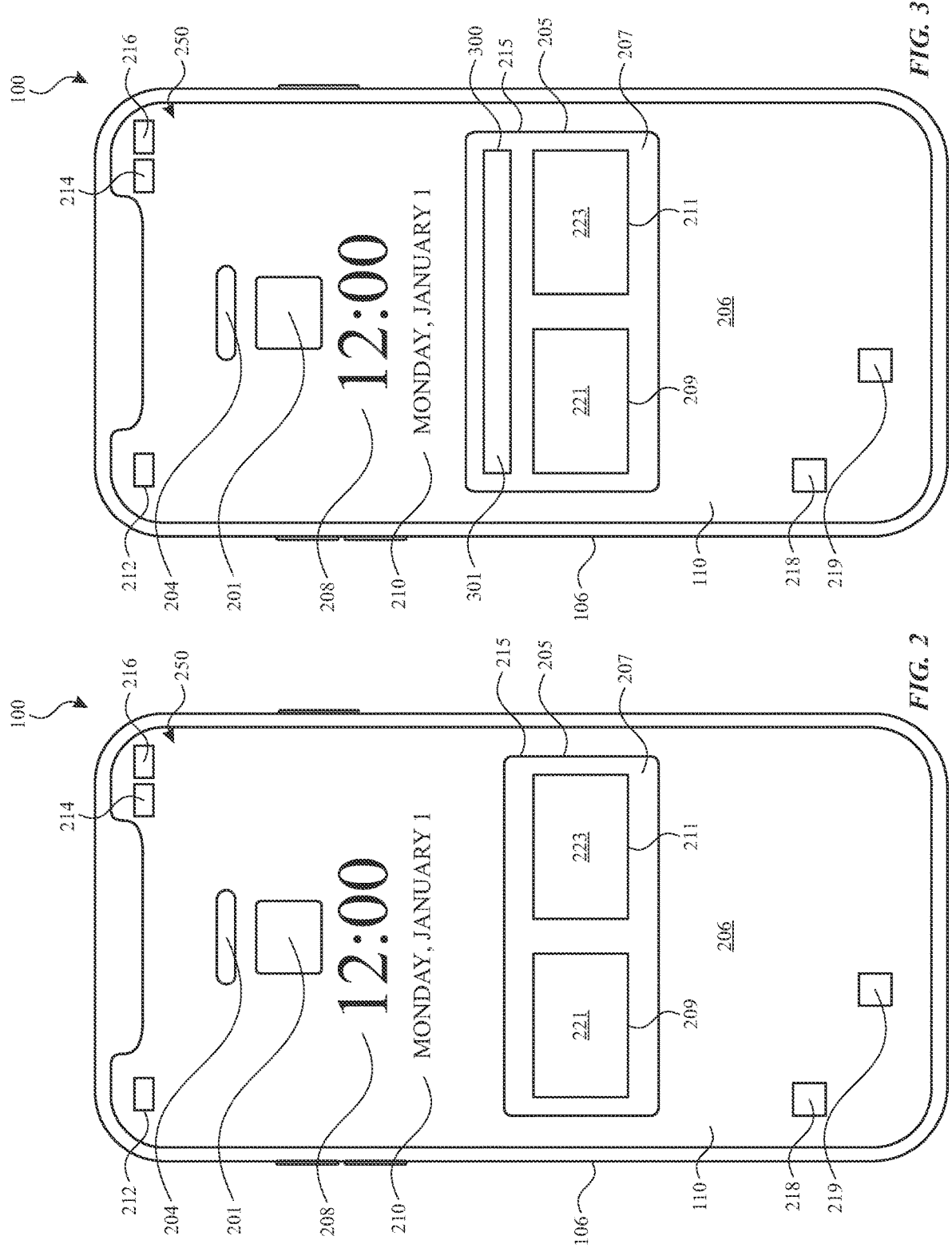

DYNAMICALLY RESIZABLE CONTENT FOR ELECTRONIC DEVICES

CROSS REFERENCE TO RELATED APPLICATIONS

This application claims the benefit of priority to U.S. Provisional Patent Application No. 63/340,418, entitled, "Dynamically Resizable Content for Electronic Devices", filed on May 10, 2022, the disclosure of which is hereby incorporated herein in its entirety.

TECHNICAL FIELD

The present description relates generally to electronic devices, including, for example, dynamically resizable content for electronic devices.

BACKGROUND

Electronic devices often include applications that provide information for display in a user interface of the application. To access the information from an application, a user typically needs to unlock the electronic device, launch the application, wait for the application to launch, and navigate to a relevant section of the user interface of the application that displays the information.

BRIEF DESCRIPTION OF THE DRAWINGS

Certain features of the subject technology are set forth in the appended claims. However, for purpose of explanation, several implementations of the subject technology are set forth in the following figures.

FIG. 2 illustrates a dynamically resizable user interface (UI) view in a first state in accordance with one or more implementations.

FIG. 3 illustrates the dynamically resizable UI view in a second state, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In one or more implementations, an application provides, to a system process (or user interface display process that is separate from the operating system), multiple states for a user interface (UI) view for the application, and one or more transition definitions each defining a transition between two of the multiple states. Each of the multiple states can specify a display element, a size for the display element, and an identifier of the display element. When a user, or content of the UI view, triggers a change from one of the multiples states to another of the multiple states of the UI view, the system process animates the change according to the one or more transition definitions. In one or more implementations, an application provides system animated transitions between application UI States, and provides application data to be displayed in the rendered UI view.

Figure 1:
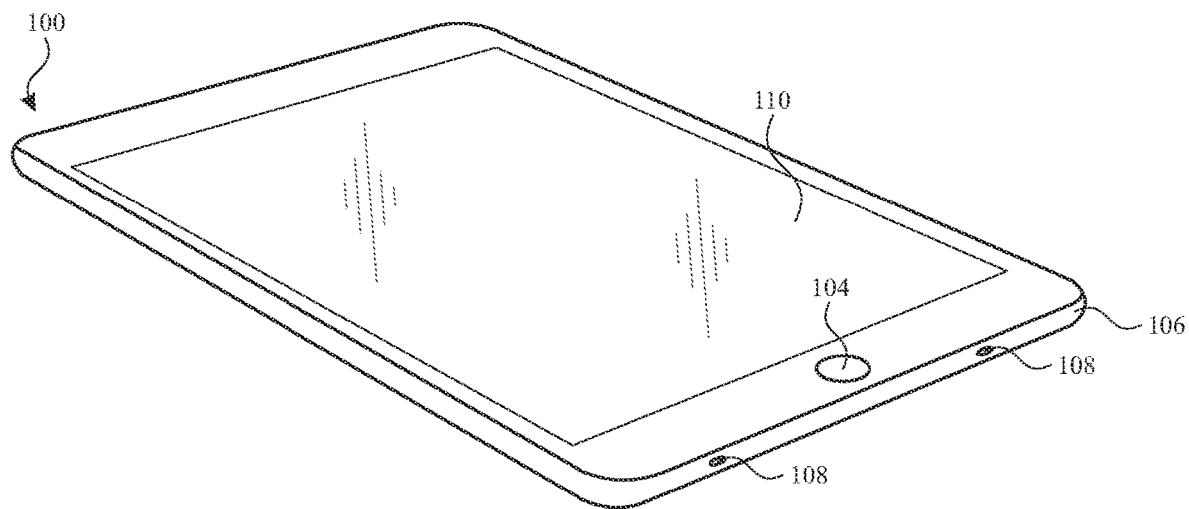
FIG. 1 illustrates a perspective view of an example electronic device that may implement various aspects of the subject technology.

An illustrative electronic device that may display content and/or dynamically resizable UI views is shown in FIG. 1. In the example of FIG. 1, electronic device 100 has been implemented using a housing that is sufficiently small to be portable and carried by a user (e.g., electronic device 100 of FIG. 1 may be a handheld electronic device such as a tablet computer, a smart phone, a smartwatch, a laptop, and the like). As shown in FIG. 1, electronic device 100 includes a display such as display 110 mounted on the front of housing 106. Electronic device 100 includes one or more input/output devices such as a touch screen incorporated into display 110, a button or switch such as button 104 and/or other input output components disposed on or behind display 110 or on or behind other portions of housing 106. Display 110 and/or housing 106 include one or more openings to accommodate button 104, a speaker, a light source, or a camera.

In the example of FIG. 1, housing 106 includes openings 108 on a bottom sidewall of housing 106. One or more of openings 108 forms a port for an audio component. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a wearable device such as a smart watch, a pendant device, or other wearable or miniature device, a media player, a gaming device, a navigation device, a computer monitor, a television, a headphone, or other electronic equipment having a display. In some implementations, electronic device 100 may be provided in the form of a wearable device such as a smart watch. In one or more implementations, housing 106 may include one or more interfaces for mechanically coupling housing 106 to a strap or other structure for securing housing 106 to a wearer.

FIG. 2 illustrates an example of a dynamically resizable UI view 205 displayed by the electronic device 100. In some embodiments, the UI view 205 is a system UI view (e.g., a view provided by an operating system of the electronic device 100). In one or more implementations, the UI view 205 may be a UI view for a widget. As illustrated in FIG. 2, the UI view 205 is displayed by a lock screen 250 of the electronic device. However, in some embodiments, the electronic device is constructed to display dynamically resizable UI views on any one of a lock screen (e.g., lock screen 250), a home screen, and the like.

In some embodiments, the UI view 205 is a UI view that is displayed by a system process.

In some implementations, the system process generates the UI view 205 in accordance with parameters provided by an application. In some implementations, the system process is an application framework that receives configuration data associated with an application, and generates the UI view 205 in accordance with the configuration data. In some implementations, the configuration data is included in a template data structure. In some implementations, the configuration data is defined using a declarative syntax.

In some implementations, the UI view includes at least one data element (e.g., first element 209 or second element 211) associated with system data (e.g., a battery indicator, a signal strength indicator, or a timer). In some implementations, the UI view includes at least one data element (e.g., first element 209 or second element 211) associated with application data (e.g., fitness tracking data, sports scores, etc.).

As shown in FIG. 2, the lock screen 250 is displayed by the electronic device 100 while the electronic device 100 is a locked state. For example, the electronic device 100 may include the housing 106 and the display 110 that displays the lock screen 250. In the example of FIG. 2, the lock screen 250 includes an unlock feature 219. The unlock feature 219 may be selectable by a user of the electronic device 100 to initiate an unlock procedure (e.g., a procedure in which the user provides and/or the device obtains authentication information to unlock the electronic device). In the example of FIG. 2, the lock screen 250 also includes a lock indicator 201 indicating that the electronic device is locked. In one or more implementations, when authentication information is received by the electronic device 100, and before the user provides an additional interaction to navigate away from the lock screen 250 (e.g., to another screen, such as a home screen or a user interface of an application or a system process), the lock indicator 201 may indicate that the electronic device 100 is unlocked for a period of time while the lock screen 250 continues to be displayed.

In the example of FIG. 2, the lock screen 250 also includes a carrier indicator 212, a signal strength indicator 214, a battery indicator 216, and a functional element 218 (e.g., a displayed element that can be used to access a limited functionality of the electronic device 100, such as a light source functionality or a camera functionality). In some implementations, one or more of the carrier indicator 212, signal strength indicator 214, battery indicator 216, and functional element 218 is displayed within a dynamically resizable UI view. As shown in FIG. 2, the lock screen 250 may also include a background 206 (e.g., an image or a pattern of colors), a dynamically resizable UI view 205 (e.g., a UI view in one or more states defined by a corresponding application or system process that is installed at the electronic device 100), and may include publicly available data, such as a time 208 and a date 210. In the example of FIG. 2, the electronic device 100 includes one or more sensing components 204 (e.g., a camera and/or an infrared sensor or depth sensor) that can be used for obtaining biometric authentication information from a user of the electronic device. In other examples, the electronic device 100 may obtain biometric or non-biometric (e.g., passcode) authorization information from other sensors and/or input components, such as a touch screen integrated into the display 110, or a keyboard or other input interface of the electronic device 100.

In the example of FIG. 2, the UI view 205 includes a background 207 within a border 215, a first element 209, and a second element 211. However, in other examples, the UI view 205 might include any number of elements (e.g., 209). As shown, the first element 209 may include a display of data 221. The second element 211 may include a display of data 223. In the example of FIG. 2, the UI view 205 is a bordered UI view having a border 215 that sets the UI view 205 apart from the background 206. In one or more other implementations, the UI view 205 may be a borderless display element. In a borderless state of the UI view 205, the first element 209 and/or the second element 211 and/or the second element 211 and/or their respective associated data 221 and data 223 may be displayed to appear as integrated content with the background 206.

In some variations, one or more data (e.g., data 221 and/or data 223) displayed by a UI view (e.g., UI view 205) is obtained, by the electronic device, from an application running on the electronic device. In some variations, one or more data (e.g., data 221 and/or data 223) displayed by a UI view (e.g., 205) is obtained, by the electronic device, from a remote server (e.g., remote with respect to the device 100) associated with the UI view.

In one illustrative example, the UI view 205 may include a single graphical display element (e.g., first element 209) for a timer value of a countdown timer. In various implementations, the data displayed by the single graphical display element may be obtained, by the electronic device, from a timer application running on the electronic device.

In another illustrative example, the UI view 205 may include one or more graphical display elements (e.g., first element 209 and/or second element 211) of a sports-related application that is installed at the electronic device 100. The sports-related application may be inactive at the time of display of the UI view 205. In this example, the data 221 may be a current score of a first individual or team currently participating in a competitive sporting event (e.g., a basketball game, a football game, a soccer game, a hockey game, a golf match, a chess tournament, a rugby game, tennis match, a fencing tournament, bowling match, a curling match, or the like). In this example, the data 223 may be a current score of a second individual or team currently participating in (e.g., against the first individual or team) the sporting event. In various implementations, the data 221 and the data 223 may be obtained, by the electronic device, from a server associated with the sports-related application, while the sports-related application at the electronic device is inactive at the electronic device 100. In this way, a UI view 205 can display dynamic (e.g., current, real-time) data without having to operate the sports-related application.

The example of a sports-related application and a sporting event are merely illustrative. In another illustrative example, a user of the electronic device 100 may be waiting for, or riding in, a rideshare vehicle associated with a rideshare application installed at the electronic device 100. The user may view a location of the rideshare vehicle, an estimated time of arrival, an estimated cost, or other dynamic data for the rideshare vehicle in a full user interface of the rideshare application (e.g., in a full user interface of the rideshare application, such as a user interface generated by the rideshare application and not by a system process). In this example use case, when the UI view 205 (generated by a system process) is displayed instead of the full user interface of the rideshare application (generated by the application), the UI view 205 may display some or all of the data associated with the rideshare vehicle. For example, the first element 209 may display data 221 corresponding to a current location of the rideshare vehicle, and the second element 211 may display data 223 corresponding to an estimated time of arrival of the rideshare vehicle.

In general, the UI view 205 may be a system-generated system resizable UI view (e.g., a system-generated notification, a status bar UI view, a toolbar UI view, a system tray view, a taskbar view, or other system-generated UI view that displays system-generated data) or a system-generated application-specific resizable UI view that is separate from a full (application-generated) UI of an application and that can be displayed while the full UI of the application is inactive (e.g., minimized or closed). For example, a full UI of an application may be resizable by providing user-provided re-sizing inputs to the application for modification of the full UI by the application. In contrast, the UI view 205 may be resizable by a system process of the electronic device 100 without providing any user input information to an application (e.g., by animating the resizing and/or updating the state of the UI view based on state information, transition information, and/or trigger information previously received from the application).

In the example of FIG. 2, the UI view 205 is displayed in a first state. In this first state, the UI view 205 is a first size and includes the background 207, the border 215, the first element 209, and the second element 211. The first state may be defined by the underlying application for the UI view 205. For example, the first state may be defined by the underlying application prior to the electronic device displaying the UI view 205. In one or more implementations, the first state illustrated in the example of FIG. 2 may be one of several states of the UI view 205 that are defined by the underlying application.

For example, FIG. 3 illustrates an example in which the electronic device 100 displays the UI view 205 is in a second state that is different from the first state illustrated in FIG. 2. In the example of FIG. 3, the UI view 205 in the second state. As shown in the example of FIG. 3, in the second state, the UI view 205 has a second size that is larger than the first size of the UI view 205 in the first state of FIG. 2. In the example of FIG. 3, the UI view 205 includes the same first element 209 and second element 211 (displaying the respective first data 221 and second data 223), but the first element 209 and the second element 211 have a larger size than the first element 209 and the second element 211 have in the first state of the UI view 205 of FIG. 2. The relative sizes of the UI view 205, the first element 209, and the second element 211 may be defined by the underlying application, prior to display of the UI view 205 in the first state or the second state, such as by providing state definitions for the first state and the second state to a system process of the electronic device 100.

In the example of FIG. 3, the UI view 205 also includes a third element 300 that is not included in the UI view 205 in the first state of FIG. 2. As shown, the third element 300 includes data 301. The data 301 may include static or dynamic data. As examples, static data may include application-specific data (e.g., a logo, etc.) that is unrelated to the event for which the data 221 and the data 223 is associated.

In one or more implementations, the UI view 205 may transition from the first state shown in FIG. 2 to the second state shown in FIG. 3 responsive to a user interaction with the UI view 205 in the first state of FIG. 2. For example, the user of the electronic device 100 may tap, swipe, or provide an un-pinch input at or near the location of the UI view 205 when the UI view 205 is displayed in the first state of FIG. 2 to cause an expansion of the size of the UI view 205. For example, the user may desire to view more information about a sporting event than just the score displayed in the first state of FIG. 2, or may desire to view a more graphically elaborate display of the score of the sporting event.

In one or more implementations, the UI view 205 may also, or alternatively, transition from the first state shown in FIG. 2 to the second state shown in FIG. 3 responsive to a change in the data associated with the UI view 205. For example, if the UI view 205 is displaying a score of a sporting event while in the first state of FIG. 2, the UI view 205 may (e.g., temporarily) expand to the second state of FIG. 3 when an individual or team participating in the sporting event scores. In this example, the data 301 of the third element 300 may include a notification of the score update (e.g., including a name of the individual or team that scored). In one or more implementations, the UI view 205 may be configured by its underlying application to return to the first state of FIG. 2 following a period of time after the notification is displayed with the third element 300, or to remain in the second state until a new trigger causes a change in the state.

In one or more implementations, the electronic device 100 and/or the application underlying the UI view 205 may configure one or more triggers (e.g., a user interaction, an update to the data, and/or a movement or change of other content) that cause a system process of the electronic device 100 to transition the UI view 205 from the first state of FIG. 2 to the second state of FIG. 3 (e.g., without interaction with the underlying application to detect the trigger or during the transition). For example, the underlying application may provide state definitions that include trigger definitions for various triggers between various state combinations, and include definitions of the states resulting from the various triggers, prior to the display of the UI view 205 (e.g., prior to the underlying application becoming inactivated).

In one or more implementations, in addition to providing state definitions for one or more states (e.g., including the first state of FIG. 2 and the second state of FIG. 3) for a UI view such as UI view 205, the underlying application may also provide one or more transition definitions to the system process of the electronic device 100. In one or more implementations, the transition definitions provided from the application to the system process may each define a transition between two of multiple states for the UI view 205. For example, the underlying application for the UI view 205 may provide a transition definition to the system process of the electronic device 100 that defines various aspects of the display of a transition from the first state of FIG. 2 to the second state of FIG. 3.

In one or more implementations, the transition definitions may define an animation for the transition of the UI view 205 from the first state of FIG. 2 to the second state of FIG. 3. The transition definitions may also define an animation for the transition of the first element 209 to grow from the size of the first element 209 in the first state to the size of the first element 209 in the second state. The transition definitions may also define an animation for the new addition of the third element 300 as the UI view 205 grows to include room for the third element 300. For example, the transition definition may define an animation in which the third element appears to fade in, slide in, or solidify from a particle-ized view as the size of the border 215 expands during the transition. As another example, the transition definition may define the rate at which the border 215 of the UI view 205 expands, and/or whether the border 215 expands to the size defined for the border 215 in the state definition for the second state and stops expanding, or if the border 215 expands beyond the size defined for the border 215 in the state definition for the second state and snaps back to the size defined for the border 215 in the state definition for the second state.

The example states of the UI view 205 of FIGS. 2 and 3 are merely two of many different states of the UI view 205 that can be defined by the underlying application for the UI view 205 at the electronic device 100.

Figure 4:
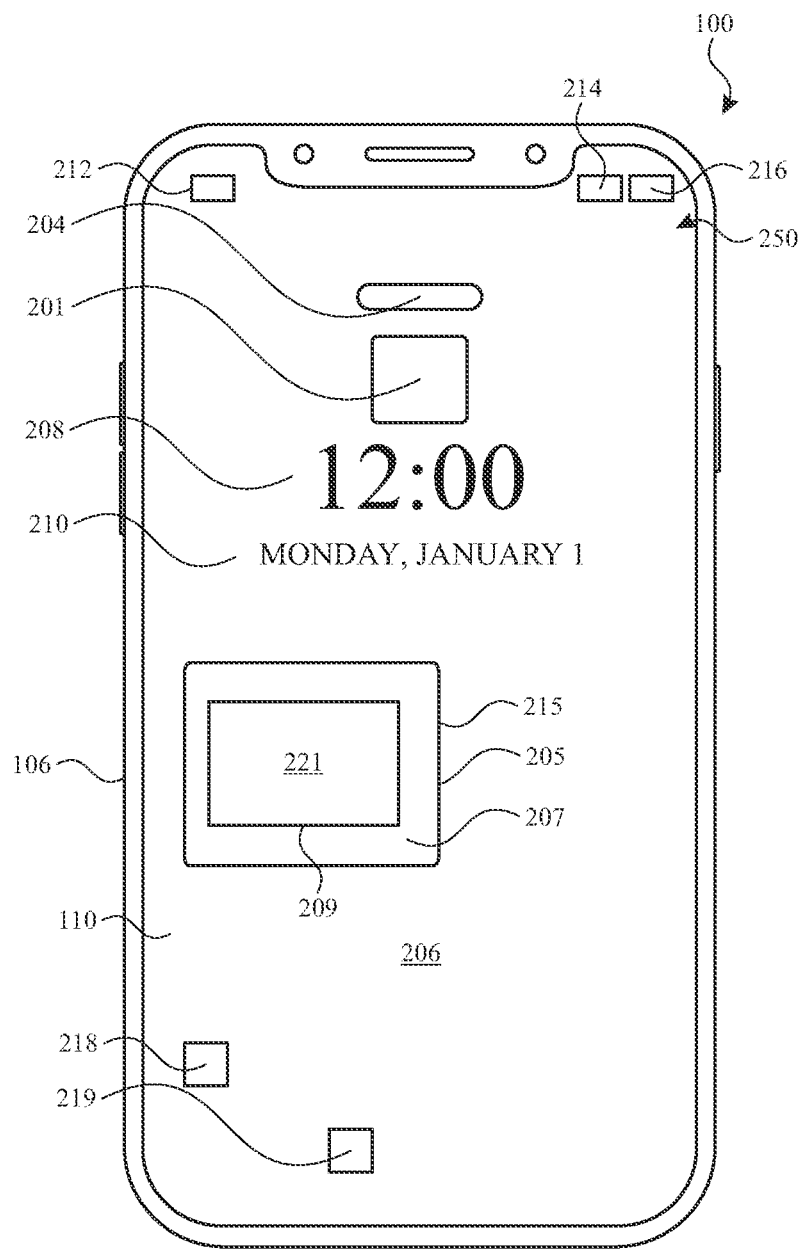
FIG. 4 illustrates a dynamically resizable UI view in a third state, in accordance with one or more implementations.

For example, FIG. 4 illustrates an example of a third state of the UI view 205. In the example of FIG. 4, the size of the border 215 of the UI view 205 is smaller than the size of the border 215 of the UI view 205 in the first state of FIG. 2 and the second state of FIG. 3. In this example, the amount of data that is displayed within the UI view 205 in the third state is also reduced relative to the amount of data that is displayed in the UI view 205 in the first state and the second state. In this example the UI view 205 does not include the second element 211 or the third element 300 that are included in the first state and the second state illustrated FIGS. 2 and 3. In one or more implementations, the data 221 of the first element 209 of the UI view 205 of FIG. 4 may be a countdown timer generated by the system process, system data (e.g., battery life, signal strength, or the like), calendar data, etc.

In one or more implementations, a system process or the underlying application for the UI view 205 may define the third state shown in FIG. 4 to include only the first element 209 and its data 221, and may also define a transition definition between the first state of FIG. 2 to the third state of FIG. 4, between the second state of FIG. 3 to the third state of FIG. 4, and/or and vice versa. For example, the underlying application may define an animation for the removal of the second element 211 and its dynamic data 223 when the UI view 205 transitions from the first state of FIG. 2 to the third state of FIG. 4 or from the second state of FIG. 3 to the third state of FIG. 4. For example, the animations in the defined transitions, when effected by the system process may cause the second element 211 and/or the third element 300 to appear to fade out, blur out, or particle-ize and disappear as the border 215 of the UI view 205 becomes smaller. In one or more implementations, the system process of the electronic device may also animate a disappearance or appearance of the border 215 during a state transition between borderless and bordered states of the UI view 205.

In one or more implementations the underlying application for the UI view 205 may also define trigger definitions that define triggers that cause the UI view 205 to transition between the third state of FIG. 4 to the first state of FIG. 2, from the third state of FIG. 4 to the second state of FIG. 3, from the first state of FIG. 2 to the third state of FIG. 4, and/or from the first state of FIG. 2 to the third state of FIG. 4. As discussed herein, an underlying application for the UI view 205 may provide the state definitions, trigger definitions, and/or the transition definitions for the various transitions between the various states of the UI view 205 to a system process of the electronic device 100 before the UI view 205 is displayed. In one or more implementations, trigger definitions that define triggers that cause transitions between multiple states of another a UI view such as UI view 205 may be incorporated into the transition definitions for the multiple states of the UI view, may be incorporated into the state definitions, and/or may be defined by the system process of the electronic device 100.

In the examples of FIGS. 2-4 the UI view 205 is shown as being displayed on the lock screen 250 of the electronic device 100, as one example of a screen on which a resizable UI view can be displayed. In implementations in which the UI view 205 is displayed and resizable on a lock screen, the UI view 205 can provide various technical advantages. For example, once a device is locked, in some devices, the entire system, including application data associated with applications installed at the electronic device can be encrypted. In order for a user to regain access to the data and/or functionality of the electronic device, the user is often required to provide authentication information that proves to the device that the user is an authorized user. As examples, the authentication information can include a passcode entered by the user, or biometric authentication information such as a fingerprint, a voice print, or facial feature information.

Following a locking event for an electronic device, the electronic device may display a lock screen. While the electronic device is locked and the lock screen is displayed, the user can provide authentication information and/or the device can automatically obtain authentication information (e.g., by obtaining imaging or depth data associated with the user's finger or face), and unlock the device if the authentication information indicates that the user is an authorized user of the device.

In one or more use cases, a user of an electronic device can use the device to view or otherwise monitor an ongoing event in the physical world using an application installed at the electronic device. As examples, a sports-related application may be used to watch or track the score of a sporting event, a rideshare application may be used to monitor the location of a rideshare vehicle before or during a ride in the rideshare vehicle, or a delivery application may be used to monitor the status of an order and/or a location of a delivery vehicle. As another example, a nature-related application may be used to monitor a natural phenomenon such as a tide, a phase of the Moon, the weather, or the like.

In one or more implementations, in order to, for example, prevent unauthorized access to an electronic device and/or to manage power usage by the device, an electronic device can be configured to automatically lock after a predetermined amount of time without receiving active user input. However, in many use cases, the user may desire to continue monitoring a physical world event that an application was being used to watch or monitor prior to locking of the device. Typically, a user would provide authentication information and navigate from the lock screen of the device back to the application user interface (UI) that was previously being used to watch or monitor the event. However, this can be a time consuming and inefficient (e.g., including in terms of device power, component, and processing resources) way for a user to continue monitoring a physical world event. It may therefore be desirable to be able to display a resizable UI view that includes certain types of data (e.g., system data, temporally-dependent data, or dynamic data such as data associated with a physical world event) on the lock screen of an electronic device. In this way, a user can be provided with the ability to continue to use the electronic device to monitor the physical world event without spending user and device resources on repeated authentication and unlocking procedures.

However, it can be challenging to obtain and display data associated with an application on a lock screen of an electronic device without allowing the application to access data and/or resources that are locked from access in the locked state of the device. For example, it may be desirable to display data associated with an application while preventing the application itself from running on the electronic device and/or from receiving information about user interactions with the lock screen of the electronic device (e.g., information which is typically protected by the device until a user provides authentication information and seeks to interact with the application).

Aspects of the subject technology can provide a resizable UI view, such as the UI view 205 of FIGS. 2-4, in a way that is power efficient and maintains user privacy and/or device security while an electronic device is in a locked state. For example, by providing state definitions, trigger definitions, and/or transition definitions to the system process of the electronic device 100 before the electronic device 100 enters a locked state, the UI view 205 can be displayed on the lock screen 250 in a way that appears to be responsive to user interactions, data triggers, and/or other content on the lock screen 250, without allowing the underlying application to receive information about user interactions with the electronic device or other content displayed on the lock screen while the electronic device 100 is in the locked state. In this way, the privacy that the user may expect when the user's device is locked can be maintained and protected.

Although various examples are described herein in which the UI view 205 is displayed on a lock screen of an electronic device, such as the lock screen 250 of FIGS. 2-4, the UI view 205 can also be displayed on other screens of an electronic device (e.g., while the electronic device is unlocked), such as home screen of the electronic device, and updated and/or animated using the state definitions, transition definitions, and/or trigger definitions from an underlying application. In one or more implementations, aspects of the subject technology can provide the resizable UI views for home screens in a power-efficient and resource-efficient (e.g., with respect to processing and/or memory resources) manner, such as by allowing a system process to handle display aspects (e.g., re-sizing animations) of a UI view for an application, while the application and/or a full UI of the application is inactive at the electronic device. For example, whether the UI view 205 is displayed on a lock screen or a home screen or any other screen of the electronic device 100, providing state definitions, trigger definitions, and/or transition definitions to the system process of the electronic device 100 before the electronic device 100 displays the UI view 205 may allow the UI view 205 to be displayed in a way that is power and computing-resource (e.g., in terms of processing and/or memory resources) efficient by displaying the UI view 205 dynamically across multiple states without requiring operation of the underlying application.

In various implementations described herein, whether a resizable UI view is displayed on lock screen or a home screen of an electronic device, in addition to the privacy, power-efficiency, and/or computing-resource efficiency advantages discussed above, aspects of the subject technology can also provide advantages in terms of developer and user efficiency. For example, a developer of an application can provide information to a system process of an electronic device that allows the system process to animate aspects of a UI view for application information, without the developer having to create or provide code for the animations. As another example, when a user wishes to view more or less information in a UI view, the user is provided with the ability to directly interact with (e.g., click, tap, or pinch) the UI view to cause a resizing of the UI view to allow an increased or decreased amount of data to be displayed (e.g., rather than the user having to edit device settings to create a new fixed-size UI view to replace a current fixed-size UI view). As another example, whether displayed on a lock screen or a home screen of an electronic device, the resizable UI views disclosed herein can allow the UI views to be automatically resized responsive to a data trigger. In this way, the user can be provided with additional information at a time when the additional information is relevant to the user, in a way that may be difficult or impossible in a fixed-size UI view.

Further details of aspects of the subject technology that can be used for displaying, updating, and/or resizing UI views on various screens, including lock screens and home screens, are discussed hereinafter in connection with FIGS. 5-9.

Figure 5:
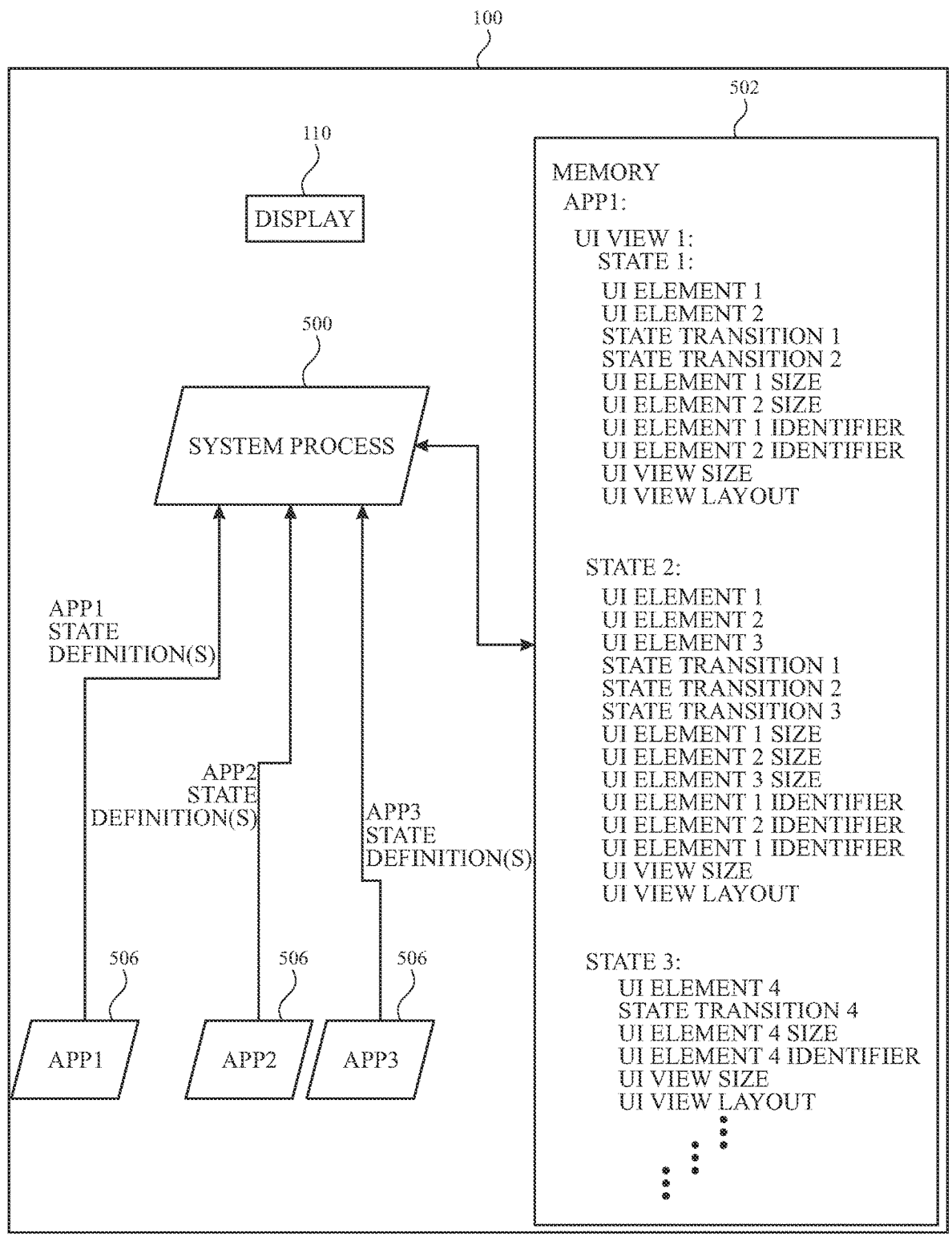
FIG. 5 illustrates a block diagram of an example electronic device obtaining application state information for application UI views, in accordance with one or more implementations.

FIG. 5 illustrates an example architecture that may be implemented by the electronic device 100 in accordance with one or more implementations of the subject technology. For explanatory purposes, portions of the architecture of FIG. 5 is described as being implemented by the electronic device 100 of FIG. 1, such as by a processor and/or memory of the electronic device; however, appropriate portions of the architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 5 can be implemented in software or hardware, including by one or more processors and a memory device containing instructions, which when executed by the processor cause the processor to perform the operations described herein. In the example of FIG. 5, the electronic device 100 includes hardware components such as display 110 and memory 502. In this example, the electronic device 100 also includes one or more logical process such as a system process 500, and/or one or more applications 506. For example, the system process 500 and/or the one or more applications 506 may be logical processes that are executed from the memory 502 by one or more processors of the electronic device 100. The system process 500 may be, for example, a process defined in hardware and/or as part of an operating system of the electronic device 100.

In the example of FIG. 5, the electronic device 100 (e.g., memory 502) stores code for three applications 506 (e.g., "APP1", "APP2", and "APP3"). However, this is merely illustrative, and it is understood that the electronic device 100 can store code for one application 506, two applications 506, more than three application 506, or generally any number of applications 506. The applications 506 may, for example, have been previously downloaded to the electronic device 100 and installed at the electronic device 100. One or more of the applications 506 may be associated with a UI view that displays data that can be periodically, occasionally, or continuously dynamic data (e.g., application-specific information, system status information, and/or information associated with a physical world event as discussed herein), while the application 506 and/or a full user interface of the application 506 is inactive.

For example, as shown in FIG. 5, one or more applications 506 can provide one or more state definitions for a UI view to the system process 500. In this example, APP1 provides one or more APP1 STATE DEFINITIONS, for one or more respective states of a corresponding UI view for APP1, to the system process 500. As illustrated in FIG. 5, the system process 500 may store the state definitions provided by APP1 in the memory 502 in association with APP1 (e.g., in an archive of state definitions).

Figure 6:
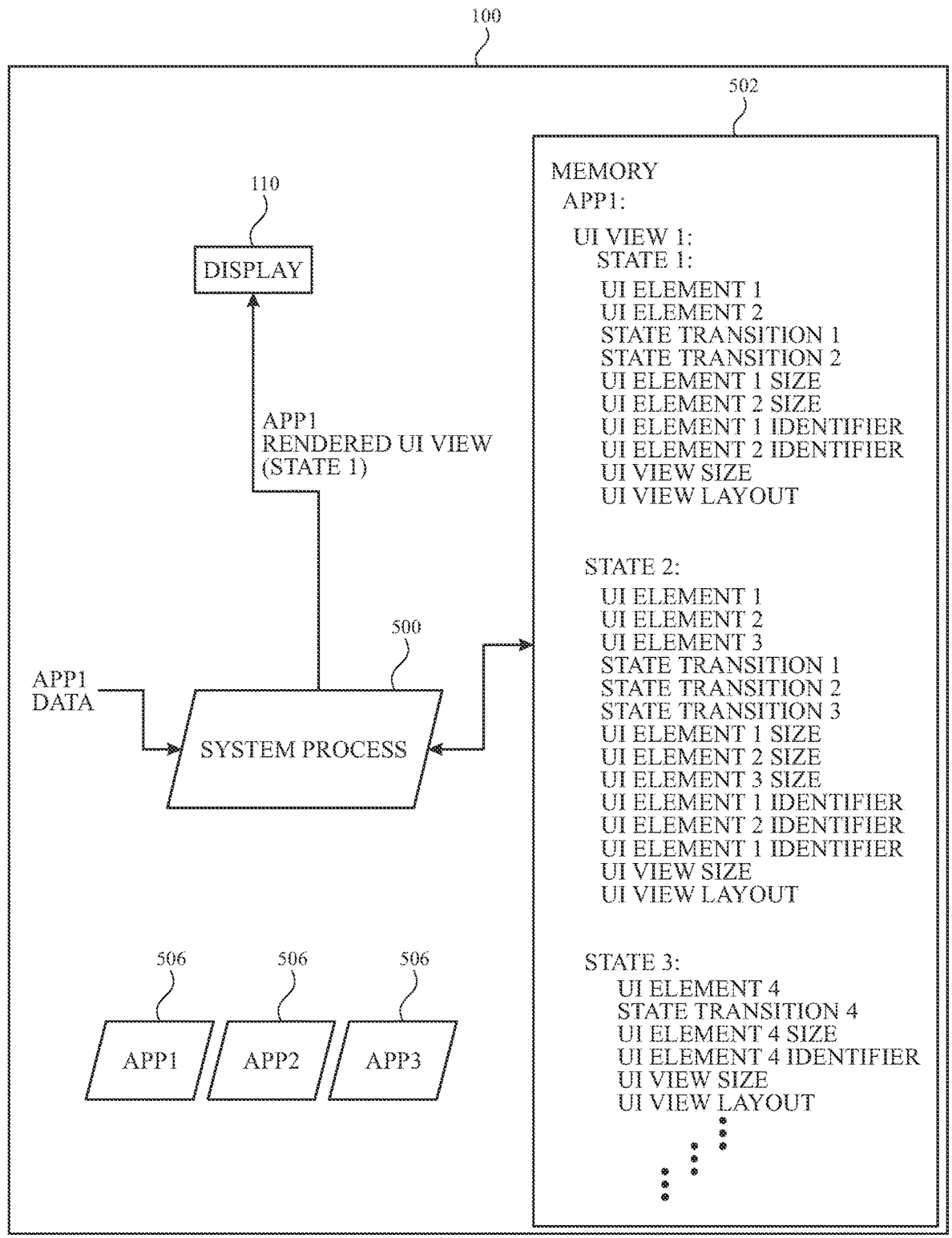
FIG. 6 illustrates a block diagram of an example electronic device generating an application UI view for display in a first state, in accordance with one or more implementations.
Figure 7:
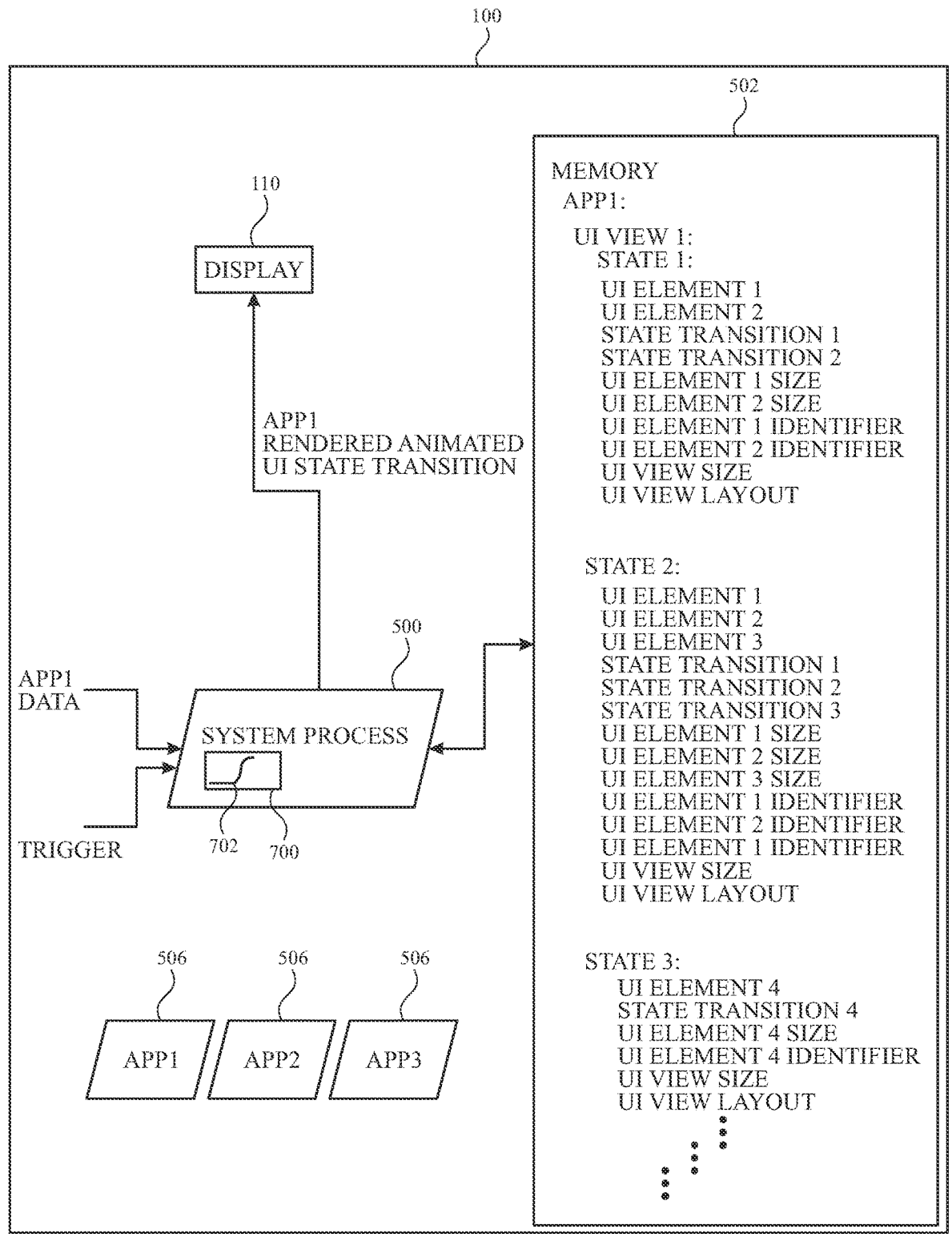
FIG. 7 illustrates a block diagram of an example electronic device animating a transition between states of an application UI view for display, in accordance with one or more implementations.

For purposes of the present discussion, the UI view 205 discussed herein in connection with FIGS. 2-4 may be a UI view for the application 506 designated as APP1 in FIGS. 5-7 (e.g., APP1 may be the underlying application for the UI view 205). As illustrated in FIG. 5, one or more additional applications may also provide state definitions for their respective UI views to the system process 500 for storage in memory 502 in association with the application (e.g., APP2 can provide APP2 state definitions and APP3 can provide APP3 state definitions to the system process 500 for storage in memory 502 in association with those respective applications 506).

In the example of FIG. 5, the APP1 state definitions provided from APP1 to the system process 500 include the information to be used by the system process 500 to display the UI view 205 of FIGS. 2, 3, and 4 in the respective first, second, and third states shown therein. For example, as shown in FIG. 5, the APP1 state definitions may include, for first UI view (e.g., UI VIEW 1, corresponding to the UI view 205), definitions of the first state (e.g., STATE 1) of FIG. 2, the second state (e.g., STATE 2) of FIG. 3, and the third state (e.g., STATE 3) of FIG. 4.

As shown, the state definitions for UI VIEW 1 (e.g., the UI view 205) may include definitions of one or more UI elements of the UI view, definitions of one or more UI state transitions for the UI view, definitions of sizes for one or more of the UI elements of the UI view, identifiers for one or more of the UI elements of the UI view, a size of the UI view (e.g., a size of the UI view 205), and/or a layout of the UI view (e.g., a layout of the UI elements of the UI view 205 relative to other UI elements, a border, a background, etc. of the UI view). For example, for the first state of the UI view 205, the system process 500 may receive, and the memory 502 may store, a definition of the first element 209 (e.g., the UI ELEMENT 1), a definition of the second element 211 (e.g. UI ELEMENT 2), a definition of the transition of the first element 209 from the first state to another state (e.g., STATE TRANSITION 1), a definition of the transition of the second element 211 from the first state to the other state (e.g., STATE TRANSITION 2), a size of the first element 209 (e.g., UI ELEMENT 1 SIZE) in the first state, a size of the second element 211 (e.g., UI ELEMENT 2 SIZE) in the first state, an identifier of the first element 209 (e.g., UI ELEMENT 1 IDENTIFIER), an identifier of the second element 211 (e.g., UI ELEMENT 2 IDENTIFIER), a size of the border 215 of the UI view 205 (e.g., UI VIEW SIZE), and/or a layout of the UI view 205 (e.g., UI VIEW LAYOUT). The UI VIEW LAYOUT may define the locations of the first element 209 and the second element 211 within and relative to the border 215 and/or relative to each other and/or other elements of the UI view (as an example).

UI ELEMENT 1 may define a graphical object (e.g., a rectangular object including text, a rectangular object including an image, a circular object containing text or an image, etc.) and/or the data (e.g., data 221, including a source for the data 221) for display within the graphical object for first element 209, an update rate for the data, and/or the color, background, and/or one or more other visual aspects of the first element 209. UI ELEMENT 2 may define a graphical object (e.g., a rectangular object including text, a rectangular object including an image, a circular object containing text or an image, etc.) and/or the data (e.g., data 223, including a source for the data 223) for the second element 211, an update rate for the data, and/or the color, background, and/or one or more other visual aspects of the second element 211. The STATE TRANSITION 1 may define, for example, an animation type (e.g., blur in, blur out, translate in, translate out, fade in, fade out, particle-ize, snap, balloon, rotate, spin, flash, etc.) of an animation for the transition of the first element 209 from the first state to another state. The STATE TRANSITION 2 may define, for example, an animation type (e.g., particle-ize, snap, balloon, rotate, spin, flash, etc.) of an animation for the transition of the second element 211 from the first state to the other state. In one or more implementations, if an application does not provide a transition definition for one or more elements, the system process 500 may store a default animation or may determine a transition definition based on the content of the UI view.

In the example of FIG. 5, for the second state of the UI view 205 (e.g., the UI VIEW 1 for APP 1), the state definition includes information (e.g., UI ELEMENT 3, UI ELEMENT 3 SIZE, UI ELEMENT 3 IDENTIFIER) defining the third element 300 in addition to the state information for the UI view and the first and second elements in the second state. In this example, the STATE TRANSITION 1 may define animations for transitions of the first element 209 from the second state to another state (e.g., the first state or the third state), the STATE TRANSITION 2 may define animations for transitions of the second element 211 from the second state to the other state (e.g., the first state or the third state), and the STATE TRANSITION 3 may define animations for transitions of the third element 300 from the second state to the other state. In this example, the UI ELEMENT 1 SIZE in the state definition for STATE 2 may be larger than the UI ELEMENT 1 SIZE in the state definition for STATE 1, the UI ELEMENT 2 SIZE in the state definition for STATE 2 may be larger than the UI ELEMENT 2 SIZE in the state definition for STATE 1, and the UI VIEW SIZE in the state definition for STATE 2 may be larger than the UI VIEW SIZE in the state definition for STATE 1 (e.g., as illustrated in FIGS. 2 and 3). In this example, the UI VIEW may define the layout of the location of the third element 300 relative to (e.g., above in the example of FIG. 3) the first element 209 and the second element 211.

In one or more implementations, transition definitions, such as STATE TRANSITION 1 and STATE TRANSITION 2, may include a single transition definition for a UI element that can be applied to any transition to or from that UI element in a state transition, or may include multiple transition definitions between specific pairs of states and/or for particular transition direction between the pairs of states. In one or more implementations, a transition definition may be defined one way, and reverse transitions can use an inverse of the defined transition, or the transition definitions for can be defined separately for transitions to and from a particular state of a UI element.

In the example of FIG. 5, the state definition for the third state of FIG. 4 (e.g., STATE 3) includes a definition for a fourth element (e.g., UI ELEMENT 4, which may be the same as the first element 209 as in the example of FIG. 4, or may be different from the UI elements that are included in STATE 1 and STATE 2), a definition (e.g., STATE TRANSITION 4) of animations for a transition of the fourth element from the third state to another state (e.g., to the second state or to the first state), a definition (e.g., UI ELEMENT 4 SIZE) of the fourth element in the third state, an identifier of the fourth element (e.g., UI ELEMENT 4 IDENTIFIER), a definition (e.g., UI VIEW SIZE, such as a size of the border 215 or boundary of the UI view) of a size of the UI view 205 in the third state, and a definition of a layout (e.g., UI VIEW LAYOUT) of the fourth element (e.g., relative to the border 215). In this example, the STATE TRANSITION 4 may define animations for transitions of the fourth element (e.g., first element 209 or another, different UI element) from the third state to the first state or the third state to the second state. In this example, the UI ELEMENT 4 SIZE in the state definition for STATE 3 may be smaller than the UI ELEMENT 1 SIZE in the state definition for STATE 1 and the UI ELEMENT 1 SIZE in the state definition for STATE 2, and the UI VIEW SIZE in the state definition for STATE 3 may be smaller than the UI VIEW SIZE in the state definition for STATE 1 and STATE 2 (e.g., as illustrated in FIGS. 2-4).

In the example of FIG. 5, only the contents of the APP1 state definitions for UI VIEW 1 (e.g., the UI view 205) are visible. However, the system process 500 may receive, and/or the memory 502 may store, state definitions for additional states for UI VIEW 1, additional states for other UI views associated with the same application 506, and/or state definitions for one or more other UI views associated with other applications (e.g., APP2, APP3, etc.).

In one or more implementations, the state definitions (e.g., APP1 STATE DEFINITION(S), APP2 STATE DEFINITION(S), and APP 3 STATE DEFINITION(S)) shown in FIG. 5 may include all of the state definition information illustrated in FIG. 5 (e.g., including the transition definitions between the various states and/or trigger definitions for triggering the transitions). In one or more other implementations, transition definitions and/or trigger definitions may be provided from the applications 506 to the system process 500 separately from the state definitions (e.g., APP1 STATE DEFINITION(S), APP2 STATE DEFINITION(S), and APP 3 STATE DEFINITION(S)) shown in FIG. 5. In one or more implementations, transition definitions may include trigger definitions. In one or more implementations, state definitions may include trigger definitions. In one or more implementations, trigger definitions may be determined by the system process 500.

In one or more implementations, the applications 506 may provide the state definitions and the transition definitions to the system process 500 via a template (e.g., a single template or multiple templates can be used). In one or more implementations, the applications 506 may provide the state definitions and the transition definitions to the system process 500 via an application programming interface (API). In one or more implementations, the applications 506 may provide the state definitions and the transition definitions to the system process 500 via a file system (e.g., an application 506 may store the state definitions and/or transition definitions) in a template and save the template in a known directory that is parsed by the system process 500 (e.g., the definitions may be saved as a resource file for the application, etc.). In one or more implementations, the applications 506 may provide the state definitions and the transition definitions to the system process 500 by a combination of one or more templates and one or more API calls (e.g., state definitions via template and transition definitions via API, state definitions via template and transition definitions via template, state definitions via API and transition definitions via API, or state definitions via API and transition definitions via template). In one or more implementations, a template may have a format consumable by the system process 500 for rendering at least one UI view (e.g., UI view 205) in accordance with information included in the template.

The providing of the state definitions illustrated in FIG. 5 may be performed in advance of the corresponding a UI view (for which the state definitions define one or more states) being displayed, so that the system process 500 of the electronic device 100 can render the corresponding graphical having the data, and the layout, size, and/or other visual features of the UI view in any of various states defined in the state definitions for at least a period of time while the application itself is inactive.

For example, FIG. 6 illustrates an operation of the electronic device 100 that may be performed after the state definitions have been provided from the applications 506 to the system process 500 and stored in the memory 502. For example, the operations illustrated in FIG. 6 may be performed while the electronic device 100 is in a locked state, and while the lock screen 250 of the electronic device 100 is displayed on the display 110 of the electronic device 100.

For example, as shown in FIG. 6, the applications 506 of the electronic device 100 may be inactive while the system process 500 renders the UI view for the UI view 205 for display by the display 110 of the electronic device 100. In the example of FIG. 6, the system process 500 obtains the state definition previously provided by APP1 for STATE 1 for UI VIEW 1 for APP1 from the memory 502, and renders the APP1 RENDERED UI VIEW for that state using the obtained state definition. The system process 500 provides the APP1 RENDERED UI VIEW to the display 110 for display as the UI view 205 (e.g., as in the example of FIG. 2).

As shown in FIG. 6, the system process 500 may also receive APP1 DATA corresponding to APP1. The system process 500 may include some or all of the APP1 DATA in the APP1 RENDERED UI VIEW. For example, the APP1 DATA may include dynamic data. For example, the APP1 DATA may include the data 221 and the data 223 of FIG. 2. The APP1 DATA may be received from APP1 and/or from a server that is remote from the electronic device 100 and associated with APP1. For example, in or with the state definition(s) provided from the applications 506 to the system process 500, the applications 506 may provide one or more links to communication channels for system process access to the APP1 data. For example, the system process 500 may use the one or more links to subscribe to one or more publication channels by which the applications 506 publish application-related dynamic data. The publication channels may be hosted by one or more servers associated with the applications 506. In this way, the system process 500 can receive APP1 DATA from a server associated with APP1, while APP1 is inactive at the electronic device. As examples, the APP1 data may include score data for an ongoing sporting event from a server associated with a sports-related application installed at the electronic device 100, or may include location data for a rideshare vehicle from a rideshare server associated with a rideshare application installed at the electronic device 100 or for a delivery vehicle associated with a delivery application installed at the electronic device 100. In some implementations, the data is data that is stored on the device 100 (e.g., in memory, in non-volatile storage, in one or more hardware registers, etc.). In some implementations, the data is data that is generated by the electronic device 100 (e.g., the system process 500). For example, in a use case in which the UI view 205 displays system data (e.g., battery information, a timer, signal strength information, or other data not provided from an application), the system process may generate the data to be displayed in UI view 205.

In one or more other implementations, some or all of the APP1 data may be received from APP1 prior to and/or during display of the APP1 RENDERED UI VIEW. For example, one or more of the applications 506 may also be provided with a respective data extension. The data extensions may be lightweight data providers that enable data from the applications 506 to be updated without querying data directly from the associated application 506, thereby bypassing a computationally expensive waking or launching of application 506 to obtain updated data for display by a graphical element.

In the example of FIG. 6, the APP1 RENDERED UI VIEW (e.g., the rendered UI view 205) is displayed by the system process 500 in a single state (e.g., any of the states illustrated in FIG. 2, 3, or 4). FIG. 7 illustrates an example operation of the electronic device 100 for rendering a transition between two states of the UI view 205, without involvement (e.g., without waking, or otherwise operating) of the underlying application, APP 1. As shown in FIG. 7, while APP1 is inactive, the system process 500 may receive a trigger to transition from one state (e.g., STATE 1) to another state of the UI VIEW 1 (e.g., the UI view 205). For example, the trigger may be received via a user interface of the electronic device 100, such as by receiving a user interaction with the displayed APP1 rendered UI view for STATE 1 with a touch sensitive element of the display 110. As another example, the trigger may be a data-driven trigger that corresponds to an update to the APP1 DATA (e.g., when an individual or team scores in a sporting event, or when a rideshare vehicle arrives at a pickup location or a destination). Responsive to the trigger, the system process 500 may obtain one or more transition definitions for the transition from STATE 1 to the other state, and may animate the transition on the display 110 according to the transition definition. For example, as shown in FIG. 7, the system process 500 may generate an APP1 RENDERED ANIMATED UI STATE TRANSITION according to the transition definition, and provide the APP1 RENDERED ANIMATED UI STATE TRANSITION to the display 110 for display.

As an example, the system process 500 may receive, in the APP1 DATA, an indication of an update to a score of a sporting event. Responsive to the indication of the update to the score, the system process 500 may obtain the STATE TRANSITION 1 and the STATE TRANSITION 2 from the STATE 1 definition of UI VIEW 1 for APP1, and may generate the APP1 RENDERED ANIMATED UI STATE TRANSITION from STATE 1 to STATE 2 based on the obtained STATE TRANSITION 1 definition and the STATE TRANSITION 2 definition. The APP1 RENDERED ANIMATED UI STATE TRANSITION may include one or more animations, over time, of one or more elements of a UI View. For example, the APP1 RENDERED ANIMATED UI STATE TRANSITION may include an animation of the first element 209 over time and an animation of the second element 211 over time based on the respective STATE TRANSITION 1 definition and the STATE TRANSITION 2 definition. The APP1 RENDERED ANIMATED UI STATE TRANSITION may also include an animation of the introduction of the third element 300 in the UI view over time, and/or an animation of the overall UI VIEW 1 over time during the transition (e.g., based on STATE TRANSITION 3 and/or other transition definition information previously received from APP1).

In one or more implementations, when a transition from one state to another state is triggered at the system process 500 (e.g., by a user interaction with the UI view 205 or another element of the screen on which the UI view 205 is displayed, by a data trigger, or by a movement or change of another element of the screen on which the UI view 205 is displayed), the system process 500 may identify (e.g., using the UI ELEMENT N IDENTIFIERS for a current state and a destination state), elements that are included in both a current state of the UI view 205 and the destination state of the UI view (e.g., first element 209 and second element 211 in the example of a transition from the first state of FIG. 2 to the second state of FIG. 3), elements that are in the current state of the UI view 205 and not in the destination state of the UI view 205 (e.g., the third element 300 in the example of a transition from the second state of FIG. 3 to the first state of FIG. 2 or the third state of FIG. 4), and/or elements that are not in the current state of the UI view 205 but are in the destination state of the UI view 205 (e.g., third element 300 in the example of a transition from the first state of FIG. 2 or the third state of FIG. 4 to the second state of FIG. 3).

The system process 500 may then identify (e.g., based on application-provided transition definitions and/or system-level preferences) a first animation (e.g., a blending animation, such as based on interpolated views between the view of the elements in the current state and the view of the elements in the destination state) for the elements that are included in both the current state and the destination state. The system process 500 may also identify one or more second animations (e.g., a fade out, a blur out, a translate out, a particle-ize and disappear animation, etc.) for one or more elements that are included in the current state and not included the destination state. The system process 500 may also identify one or more third animations (e.g., a fade in, a blur in, a translate in, a solidify from particle-ized animation, etc.) for one or more elements that are not included in the current state and are included the destination state.

The system process 500 may also, without involvement of the underlying application (e.g., APP1), determine one or more timelines for the transition of the UI view 205 and/or one or more elements thereof. In one or more implementations, the timelines may be determined, by the system process, to accommodate other display content to be displayed, and of which the underlying application for the UI view 205 is not (and may not be authorized to be) aware.

As examples, the system process 500 may animate the transitions of various elements of the UI view 205 and/or of the overall UI view 205 at various different times and/or various different rates based on system preferences and/or information that is not provided by, or accessibly by, the underling application for the UI view 205. For example, the transition of the size of the first element 209 of FIG. 2 from the first state of FIG. 2 to the second state of FIG. 3 may occur before and/or faster than the transition of the size of the second element 211 of FIG. 2 from the first state of FIG. 2 to the second state of FIG. 3. As another example, the system process 500 may animate the introduction of the third element 300 of FIG. 3 before or after (e.g., and/or at a different rate than) animating the increase in size of the first element 209 and the second element 211 in the transition from the first state of FIG. 2 to the second state of FIG. 3. In one or more implementations, the system process 500 may determine a time (e.g., one second, several seconds, or a fraction of a second) for the overall transition of the current state of the UI view 205 to the destination state thereof.

As shown in FIG. 7, in the system process 500 may store transition time information 700, which may include one more transition times, and/or one or more transition curves, such as transition curve 702. For example, the transition curve 702 may define a linear or non-linear progression of interpolated states between the current state of the UI view 205 and the destination state of the UI view 205. The transition curve 702 may also be applied to control the progression of non-interpolate animations, such as fade-ins, fade-outs, blur-ins, blur-outs, etc. For example, the example transition curve 702 of FIG. 7, if applied to an animation of a transition of an element of the UI view 205 would cause very little change in the appearance of the element for a first half of a transition time, rapid change of the element (according to a defined animation for that element) over a third quarter of the transition time, and slowing change (according to the defined animation for that element) over the last quarter of the transition time. In this way, the system process 500 can provide a dynamic and/or interactive display of a UI view 205 that can accommodate other content on the screen and give the appearance of application control, without operation of the underlying application for the UI view 205.

In one or more implementations, the transition curve 702 may be applied to an animation defined in the state definitions (e.g., and/or in separate transition definitions). For example, the system process 500 may define a time (e.g., an overall time for the state transition, such as one second, two seconds, four seconds, or a fraction of a second) and a curve (e.g., the transition curve 702, such as an ease-in curve, an ease-out curve, or a linear curve), and apply the cover to the animation of the system-defined time. For a linear curve, applying the curve to the animation may cause the animation to be performed linearly over the system-defined time. For other example curves, the animation may be held until, for example, a last portion (e.g., a last fifty percent) of the time of the transition.

As illustrated in FIG. 7, in one or more implementations, the system process 500 may receive APP1 DATA while the system process 500 is animating the transition, and the APP1 DATA may be included in the APP1 RENDERED ANIMATED UI STATE TRANSITION (e.g., so that the data can continue to be displayed and/or updated during an animated state transition for the UI view 205).

Figure 8:
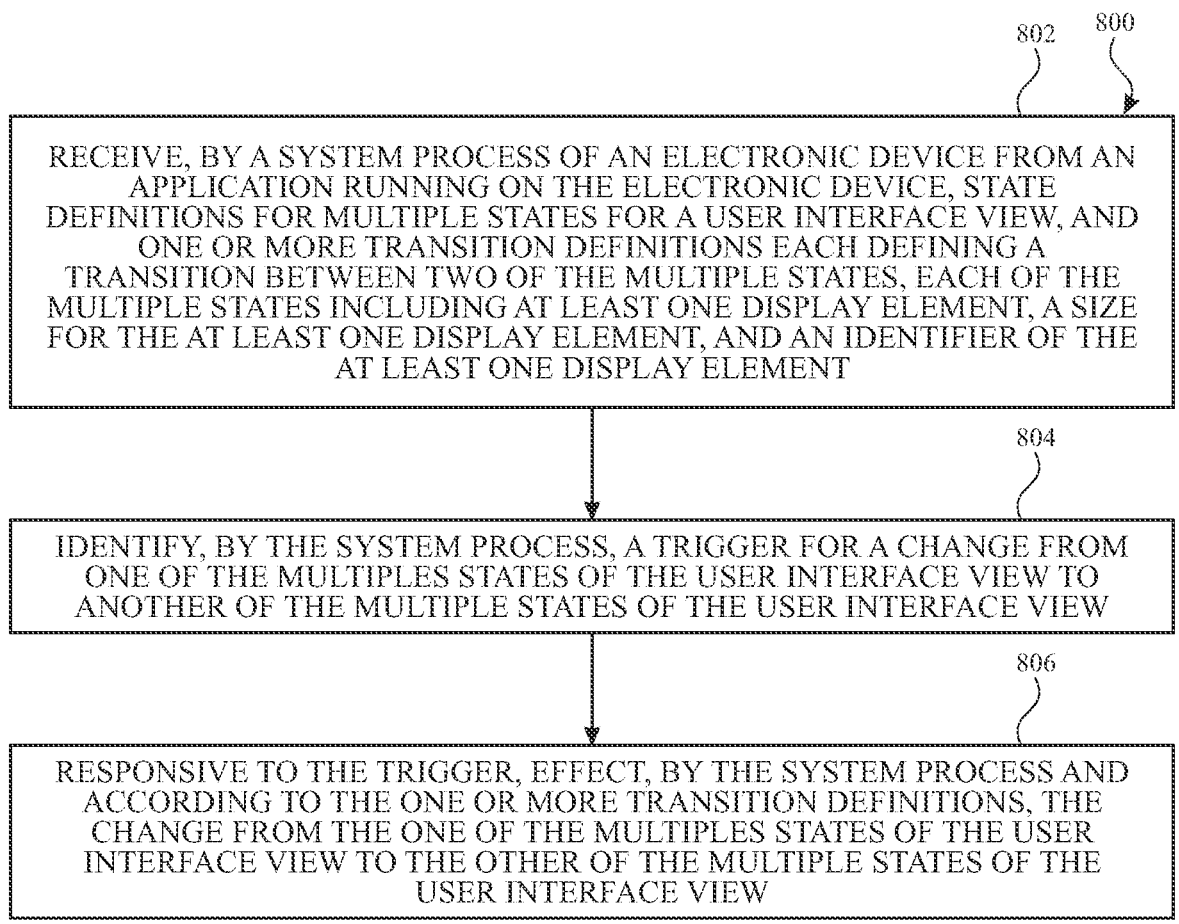
FIG. 8 illustrates a flow diagram of an example process for providing a state transition for a user interface view according to aspects of the subject technology.

FIG. 8 illustrates a flow diagram of an example process for providing dynamically resizable user interface views, according to aspects of the subject technology. The blocks of process 800 are described herein as occurring in serial, or linearly. However, multiple blocks of process 800 may occur in parallel. In addition, the blocks of process 800 need not be performed in the order shown and/or one or more blocks of process 800 need not be performed and/or can be replaced by other operations. In some embodiments, a system process (e.g., system process 500) of an operating system of an electronic device performs the process of FIG. 8. In some implementations, the system process is a user interface view display process (e.g., a process for displaying widgets, etc.) In other embodiments, a user interface view display process (e.g., a process for displaying widgets, etc.) separate from an operating system of the electronic device performs the process of FIG. 8.

In the example of FIG. 8, at block 802, a system process (e.g., system process 500) of an electronic device (e.g., electronic device 100) may receive, from an application (e.g., an application 506, such as "APP1" described herein) running on the electronic device, state definitions (e.g., APP1 STATE DEFINITIONS) for multiple states for a user interface view (e.g., UI VIEW 1 or UI view 205), and one or more transition definitions each defining a transition between two of the multiple states. In one or more implementations, each of the multiple states includes at least one display element (e.g., first element 209, second element 211, and/or third element 300), a size (e.g., a UI ELEMENT N SIZE) for the at least one display element, and an identifier (e.g., a UI ELEMENT N IDENTIFIER) of the at least one display element. In one or more implementations, the multiple states of the UI view correspond to at least one physical world event (e.g., a sporting event, a rideshare event, etc.). In one or more implementations, the user interface view may be a user interface view for a widget for the application.

At block 804, the system process may identify a trigger for a change from one of the multiples states (e.g., a current state) of the user interface view to another of the multiple states (e.g., a destination state) of the user interface view. As discussed herein, a trigger may include user interaction with the user interface view, a user interaction with another user interface view displayed concurrently with the user interface view, a change in dynamic data displayed in the user interface view, a change in a size or location of other content displayed concurrently with the user interface view, or other user or data triggers. In one or more implementations, the trigger may be an application-defined trigger defined in the state definitions and/or the transition definition(s) from the application. In one or more implementations, the trigger may be a system-defined trigger.

At block 806, responsive to the trigger, the system process may, according to the one or more transition definitions, effect the change from the one of the multiples states of the user interface view to the other of the multiple states of the user interface view (e.g., as discussed herein in connection with FIG. 7). For example, the system process may effect the change, in part, by determining a time (e.g., a transition time) and a curve (e.g., a transition curve 702) for the change, and applying the one or more transition definitions to the curve. In one or more implementations, the multiple states may be archived by the system process (e.g., in the memory 502) in advance of effecting the change (e.g., in advance of rendering animations for the transition). In one or more implementations, effecting the change may include animating the change.

In one or more implementations, the multiple states include a first state (e.g., the second state illustrated in FIG. 2) having a first element (e.g., first element 209) with a first identifier (e.g., UI ELEMENT 1 IDENTIFIER) and a second element (e.g., second element 211) with a second identifier (e.g., UI ELEMENT 2 IDENTIFIER), and the one or more transition definitions include a first transition definition (e.g., STATE TRANSITION 1) for the first element and a second transition definition (e.g., STATE TRANSITION 2) for the second element. In one or more implementations, the system process effects the change by animating a transition of the first element using the first transition definition and animating a transition of the second element using the second transition definition.

In one or more implementations, prior to effecting the change, the system process may compare a set of elements of the first state with a set of elements of a second state. For example, prior to effecting the change, the system process may determine, based on the comparing, that the second state of the multiple states includes the first element with the first identifier and the second element with the second identifier (e.g., in an example in which the first state corresponds to the first state of FIG. 2 and the second state corresponds to the second state of FIG. 3).

As another example, prior to effecting the change the system process may determine, based on the comparing, that the second state of the multiple states includes the first element with the first identifier and does not include the second element with the second identifier (e.g., in an example in which the first state corresponds to the first state of FIG. 2 and the second state corresponds to the third state of FIG. 4 or an example in which the first state corresponds to the second state of FIG. 3 and the second state corresponds to the first state of FIG. 2 or the third state of FIG. 4). In this example, animating the transition of the second element using the second transition definition may include animating (e.g., by animating a fade out, a translate out, a blur out, or a particle-ize and disappear animation) a removal of the second element from the user interface view.

In one or more implementations, the multiple states include a first state with a first element having a first identifier (e.g., the second element 211 of FIG. 2 having the identifier UI ELEMENT 2 IDENTIFIER), a second state (e.g., the state illustrated in FIG. 4) that does not include the first element having the first identifier, and a third state (e.g., the state illustrated in FIG. 3) that includes the first element having the first identifier. For example, the first element may have a first size in the first state and a second size, different from the first size, in the third state (e.g., as illustrated in the example of FIGS. 2 and 3). In one or more implementations, the third state that includes the first element having the first identifier also includes an additional element not included in the first state.

In one or more implementations, the multiple states include a first state in which the user interface view has a first size and a second state in which the user interface view has a second size (e.g., as illustrated in the examples of FIGS. 2-4). In one or more implementations, the first size and the second size of the user interface view are defined in the state definitions received from the application.

In one or more implementations, the system process receives, from the application, application information (e.g., APP1 DATA as discussed herein in connection with FIG. 7) for display within an element of one of the multiple states of the user interface view while the one of the multiple states of the user interface view is displayed. In one or more implementations, the system process may also receive, from the application, additional application information (e.g., additional APP1 DATA as discussed herein in connection with FIG. 7) for the element of one of the multiple states of the user interface view for display within the element during the effecting the change. In one or more implementations, the application information received from the application may include pre-rendered images of the application information for display at future times as dynamic data within one or more of the multiple states of the UI view. In one or more implementations, the application information received from the application may include application information received from an application extension of the application.

In one or more implementations, the system process receives, from a server associated with the application, application information (e.g., APP1 DATA as discussed herein in connection with FIG. 7) for display within an element of one of the multiple states of the user interface view while the one of the multiple states of the user interface view is displayed. In one or more implementations, the system process may also receive, from the server associated with the application, additional application information (e.g., additional APP1 DATA as discussed herein in connection with FIG. 7) for the element of one of the multiple states of the user interface view for display within the element during the effecting the change.

Figure 9:
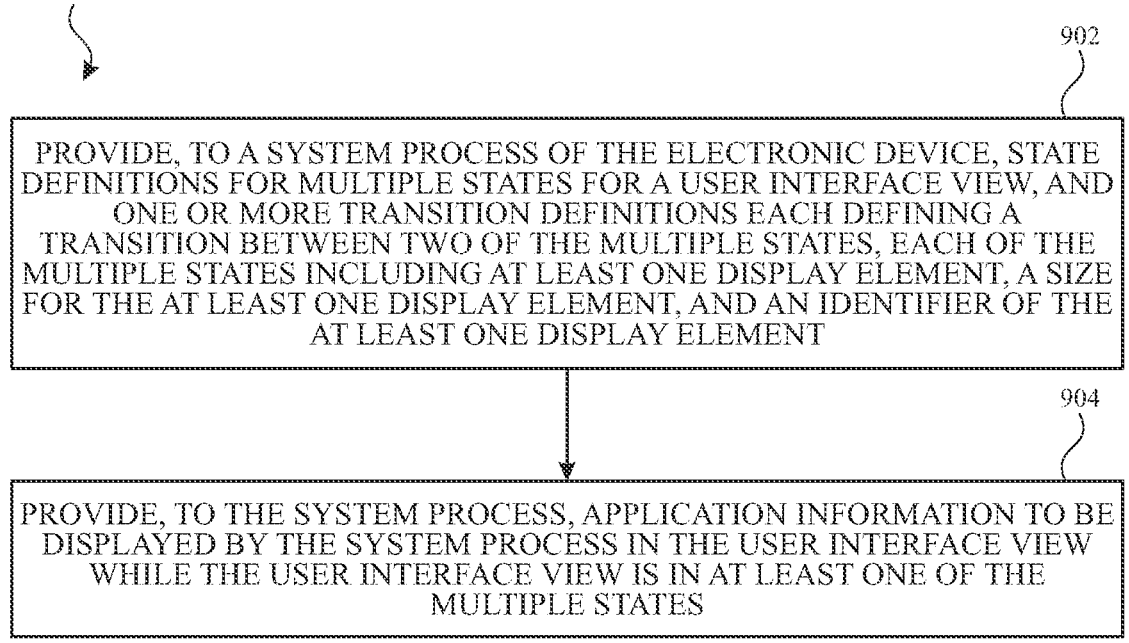
FIG. 9 illustrates a flow diagram of an example process for operating an application at an electronic device for providing for dynamic state transitions for a user interface view according to aspects of the subject technology.

FIG. 9 illustrates a flow diagram of an example process for operating an application at an electronic device for providing dynamically resizable user interface views, according to aspects of the subject technology. The blocks of process 900 are described herein as occurring in serial, or linearly. However, multiple blocks of process 900 may occur in parallel. In addition, the blocks of process 900 need not be performed in the order shown and/or one or more blocks of process 900 need not be performed and/or can be replaced by other operations.

At block 902, an application (e.g., an application 506, such as APP1) running on an electronic device (e.g., electronic device 100) may provide, to a system process (e.g., system process 500) of the electronic device, state definitions for multiple states for a user interface view, and one or more transition definitions each defining a transition between two of the multiple states (e.g., as discussed herein in connection with FIG. 5). In one or more implementations, each of the multiple states includes at least one display element, a size for the at least one display element, and an identifier of the at least one display element.

In one or more implementations, the application may provide the state definitions and the transition definitions via an application programming interface (API). In one or more implementations, the application may provide the state definitions and the transition definitions via a file system (e.g., an application 506 may store the state definitions and/or transition definitions in a template and save the template in a known directory that is parsed by the system process). For example, the definitions may be saved as a resource file for the application, etc. In one or more implementations, the application may provide the state definitions and the transition definitions by a combination of one or more templates and one or more API calls (e.g., state definitions via template and transition definitions via API, state definitions via template and transition definitions via template, state definitions via API and transition definitions via API, or state definitions via API and transition definitions via template). In one or more implementations, a template may have a format consumable by the system process for rendering at least one UI view (e.g., UI view 205) in accordance with information included in the template.

At block 904, the application running on the electronic device may provide application information (e.g., APP1 DATA) to be displayed by the system process in the user interface view while the user interface view is in at least one of the multiple states. In one or more implementations, the application may provide, to the system process, the application information for display in connection with more than one element (e.g., the first element 209, the second element 211, and/or the third element 300 described herein in connection with FIGS. 2-4) of the user interface view.

In one or more implementations, the multiple states include a first state (e.g., the state illustrated in FIG. 4) in which the user interface view has a first size and includes a first element (e.g., first element 209), and a second state (e.g., the state illustrated in FIG. 2 or the state illustrated in FIG. 3) in which the user interface view has a second size larger than the first size and includes the first element and a second element (e.g., the second element 211 or the third element 300). In one or more implementations, providing the application information may include providing at least first application information (e.g., dynamic data 221) for display in connection with the first element while the user interface view is in the first state, and providing the first application information (e.g., dynamic data 221) and second application information (e.g., dynamic data 223 and/or data 301) for display in connection with the second element while the user interface view is in the second state. In one or more implementations, providing the application information may include providing, by the application to the system process, the second application information for the second element while the user interface view is in the first state that does not include the second element (e.g., the application may provide the application information for an element irrespective of whether that element is currently displayed). In this way, the system process can determine which of the application information to display without informing the application of the displayed state of the UI view.

In one or more other implementations, the second application information may only be provided to the system process when the user interface view is in a state in which the second element is included. For example, in one or more implementations, the process 900 may also include receiving, by the application from the system process, state transition information indicating a transition from the first state to the second state. For example, the system process may provide the state transition information to the application responsive to receiving, at the system process, a trigger (e.g., as described herein in connection with FIG. 7). In one or more implementations, providing the application information may include providing, by the application to the system process, the second application information for the second element responsive to receiving the state transition information.

In one or more implementations, providing the application information from the application to the system process may include providing the first application information and the second application information by providing, to the system process, one or more links to communication channels for system process access to the first application information and the second application information according to a state of the user interface view. For example, the links may be used by the system process to subscribe to a publication channel associated with the application and by which a server associated with the application provides the application information to one or more subscriber processes. In this way, the system process can receive the application information (e.g., APP1 DATA in the example of FIGS. 6 and 7) from a server associated with the application and according to a state of the UI view, while the application is inactive at the electronic device.

In one or more implementations, the application may also provide, to the system process, additional application information to be displayed by the system process in the user interface view during a transition from one of the multiple states to another of the multiple states (e.g., while the system process is animating the transition according to the transition definition and while the application is inactive at the electronic device).

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, user activity data, user power consumption data, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing content on an electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing dynamic lock screen content on an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
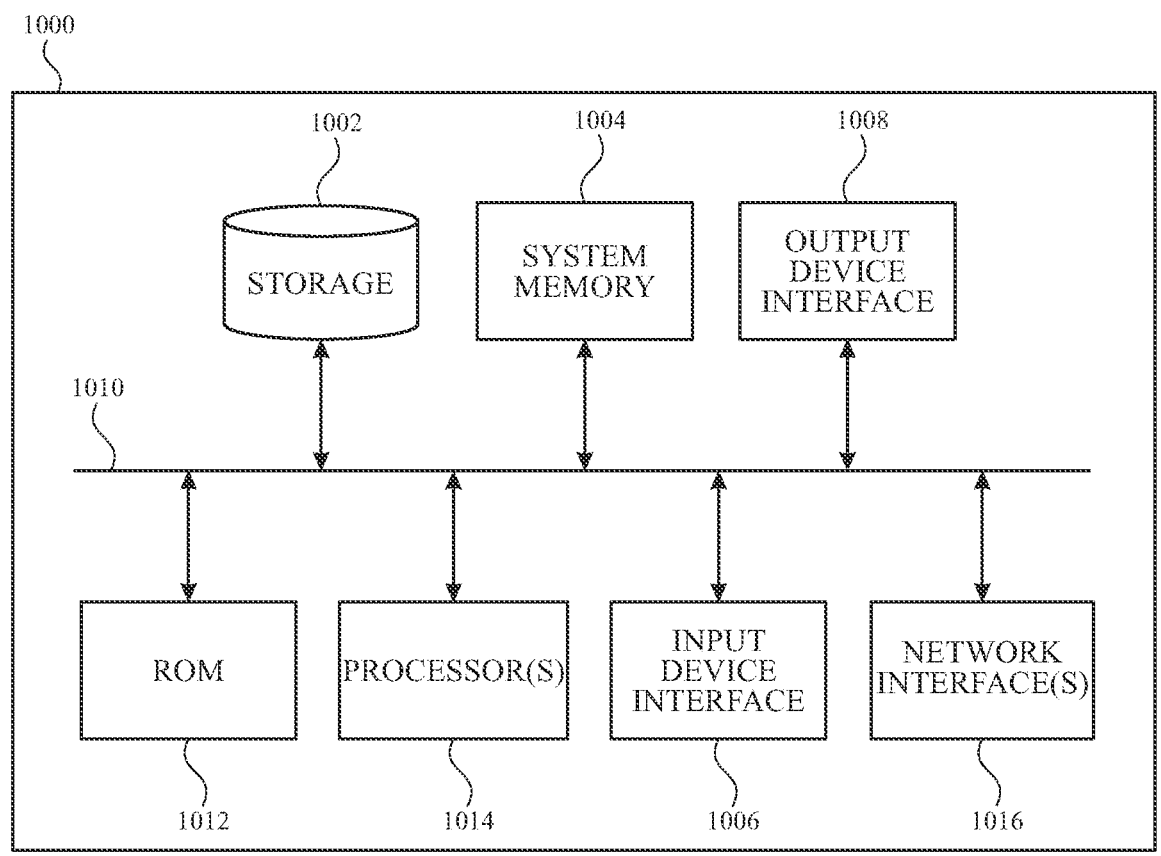
FIG. 10 illustrates an example computing device with which aspects of the subject technology may be implemented.

FIG. 10 illustrates an example computing device with which aspects of the subject technology may be implemented in accordance with one or more implementations. The computing device 1000 can be, and/or can be a part of, any computing device or server for generating the features and processes described above, including but not limited to a laptop computer, a smartphone, a tablet device, a wearable device such as smart watch, and the like. The computing device 1000 may include various types of computer readable media and interfaces for various other types of computer readable media. The computing device 1000 includes a permanent storage device 1002, a system memory 1004 (and/or buffer), an input device interface 1006, an output device interface 1008, a bus 1010, a ROM 1012, one or more processing unit(s) 1014, one or more network interface(s) 1016, and/or subsets and variations thereof.

The bus 1010 collectively represents all system, peripheral, and chipset buses that communicatively connect the numerous internal devices of the computing device 1000. In one or more implementations, the bus 1010 communicatively connects the one or more processing unit(s) 1014 with the ROM 1012, the system memory 1004, and the permanent storage device 1002. From these various memory units, the one or more processing unit(s) 1014 retrieves instructions to execute and data to process in order to execute the processes of the subject disclosure. The one or more processing unit(s) 1014 can be a single processor or a multi-core processor in different implementations.

The ROM 1012 stores static data and instructions that are needed by the one or more processing unit(s) 1014 and other modules of the computing device 1000. The permanent storage device 1002, on the other hand, may be a read-and-write memory device. The permanent storage device 1002 may be a non-volatile memory unit that stores instructions and data even when the computing device 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1014 may need at runtime. In one or more implementations, the processes of the subject disclosure are stored in the system memory 1004, the permanent storage device 1002, and/or the ROM 1012.

From these various memory units, the one or more processing unit(s) 1014 retrieves instructions to execute and data to process in order to execute the processes of one or more implementations.

The bus 1010 also connects to the input and output device interfaces 1006 and 1008. The input device interface 1006 enables a user to communicate information and select commands to the computing device 1000. Input devices that may be used with the input device interface 1006 may include, for example, alphanumeric keyboards and pointing devices (also called "cursor control devices"). The output device interface 1008 may enable, for example, the display of images generated by computing device 1000. Output devices that may be used with the output device interface 1008 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1010 also couples the computing device 1000 to one or more networks and/or to one or more network nodes through the one or more network interface(s) 1016. In this manner, the computing device 1000 can be a part of a network of computers (such as a LAN, a wide area network ("WAN"), or an Intranet, or a network of networks, such as the Internet. Any or all components of the computing device 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A method, comprising:
receiving, by a system process of an electronic device from an application running on the electronic device, state definitions for multiple states for a user interface view, and one or more transition definitions each defining a transition between two of the multiple states, wherein each of the multiple states includes at least one display element, a size for the at least one display element, and an identifier of the at least one display element;
identifying, by the system process, a trigger for a change from one of the multiple states of the user interface view to another of the multiple states of the user interface view; and
responsive to the trigger, effecting, by the system process and according to the one or more transition definitions, the change from the one of the multiples states of the user interface view to the other of the multiple states of the user interface view.

2. The method of claim 1, wherein the system process effects the change, in part, by determining a time and a curve for the change, and applying the one or more transition definitions to the curve.

3. The method of claim 1, wherein the multiple states include a first state having a first element with a first identifier and a second element with a second identifier, and the one or more transition definitions include a first transition definition for the first element and a second transition definition for the second element.

4. The method of claim 3, wherein the system process effects the change by animating a transition of the first element using the first transition definition and animating a transition of the second element using the second transition definition.

5. The method of claim 4, further comprising, prior to effecting the change, comparing, by the system process, a set of elements of the first state with a set of elements of a second state.

6. The method of claim 5, further comprising, prior to effecting the change, determining, by the system process and based on the comparing, that the second state of the multiple states includes the first element with the first identifier and the second element with the second identifier.

7. The method of claim 5, further comprising, prior to effecting the change, determining, by the system process and based on the comparing, that the second state of the multiple states includes the first element with the first identifier and does not include the second element with the second identifier.

8. The method of claim 7, wherein animating the transition of the second element using the second transition definition comprises animating a removal of the second element from the user interface view.

9. The method of claim 1, wherein the multiple states include a first state with a first element having a first identifier, a second state that does not include the first element having the first identifier, and a third state that includes the first element having the first identifier.

10. The method of claim 9, wherein the first element has a first size in the first state and a second size, different from the first size, in the third state.

11. The method of claim 1, wherein the multiple states include a first state in which the user interface view has a first size and a second state in which the user interface view has a second size.

12. The method of claim 1, further comprising, receiving, by the system process from the application, application information for display within an element of one of the multiple states of the user interface view while the one of the multiple states of the user interface view is displayed.

13. The method of claim 12, further comprising receiving, by the system process from the application, additional application information for the element of one of the multiple states of the user interface view for display within the element during the effecting the change.

14. The method of claim 1, wherein the user interface view is a user interface view for a widget for the application.

15. A method, comprising, with an application running on an electronic device:
providing, to a system process of the electronic device, state definitions for multiple states for a user interface view, and one or more transition definitions each defining a transition between two of the multiple states, wherein each of the multiple states includes at least one display element, a size for the at least one display element, and an identifier of the at least one display element; and
providing, to the system process, application information to be displayed by the system process in the user interface view while the user interface view is in at least one of the multiple states.

16. The method of claim 15, wherein the multiple states include a first state in which the user interface view has a first size and includes a first element, and a second state in which the user interface view has a second size larger than the first size and includes the first element and a second element, and wherein providing the application information comprises:
providing at least first application information for display in connection with the first element while the user interface view is in the first state; and
providing the first application information and second application information for display in connection with the second element while the user interface view is in the second state.

17. The method of claim 16, further comprising receiving, by the application from the system process, state transition information indicating a transition from the first state to the second state, wherein providing the application information comprises providing, by the application to the system process, the second application information for the second element responsive to receiving the state transition information.

18. The method of claim 16, wherein providing the application information comprises providing the first application information and the second application information by providing, to the system process, one or more links to communication channels for system process access to the first application information and the second application information according to a state of the user interface view.

19. The method of claim 15, further comprising providing, by the application to the system process, additional application information to be displayed by the system process in the user interface view during a transition from one of the multiple states to another of the multiple states.

20. A non-transitory, computer-readable medium storing instructions for a user interface view display process which, when executed by one or more processors of an electronic device, cause the one or more processors to:
- receive, from an application running on the electronic device, state definitions for multiple states for a user interface view, and one or more transition definitions each defining a transition between two of the multiple states, wherein each of the multiple states includes at least one display element, a size for the at least one display element, and an identifier of the at least one display element;
- identify a trigger for a change from one of the multiples states of the user interface view to another of the multiple states of the user interface view; and
- responsive to the trigger, effect, and according to the one or more transition definitions, the change from the one of the multiples states of the user interface view to the other of the multiple states of the user interface view.

* * * * *